United States Patent
Rios

(10) Patent No.: US 9,955,351 B1
(45) Date of Patent: Apr. 24, 2018

(54) RFID PHONE-UNLOCKING SYSTEM

(71) Applicant: Herbert Rios, Lynchburg, VA (US)

(72) Inventor: Herbert Rios, Lynchburg, VA (US)

(*) Notice: Subject to any disclaimer, the term of this patent is extended or adjusted under 35 U.S.C. 154(b) by 0 days.

(21) Appl. No.: 15/458,111

(22) Filed: Mar. 14, 2017

(51) Int. Cl.
| H04M 1/66 | (2006.01) |
| H04W 12/06 | (2009.01) |
| H04M 1/725 | (2006.01) |
| H04B 5/00 | (2006.01) |
| G06K 7/10 | (2006.01) |

(52) U.S. Cl.
CPC ........ H04W 12/06 (2013.01); G06K 7/10336 (2013.01); H04B 5/0062 (2013.01); H04M 1/72577 (2013.01)

(58) Field of Classification Search
CPC . H04W 12/06; G06K 7/10336; H04B 5/0062; H04M 1/72577
See application file for complete search history.

(56) References Cited

U.S. PATENT DOCUMENTS

| D441,524 S | 5/2001 | Shimizu |
| 8,112,066 B2 | 2/2012 | Ayed |
| 8,869,263 B2 | 10/2014 | Pasquero |
| 9,107,075 B1 | 8/2015 | Matsuoka |
| 9,135,620 B2 | 9/2015 | Chen |
| 2008/0065892 A1* | 3/2008 | Bailey ............... H04L 63/0492 713/171 |
| 2013/0298226 A1 | 11/2013 | Fang |
| 2014/0101755 A1 | 4/2014 | Tang |
| 2015/0014413 A1* | 1/2015 | Priebatsch ............ G06Q 90/00 235/383 |
| 2016/0019498 A1* | 1/2016 | Bhalodia ........... G06Q 10/0833 705/333 |
| 2016/0307012 A1* | 10/2016 | Narasimha ............ G06F 21/35 |

FOREIGN PATENT DOCUMENTS

WO    2012088804 A1    7/2012

* cited by examiner

Primary Examiner — Wayne H Cai

(57) ABSTRACT

The RFID phone-unlocking system is adapted for use with a personal data device. The personal data device further comprises an interrogator, a security code, and a logic module. The RFID phone-unlocking system is an application that is adapted to run on the personal data device. The RFID phone-unlocking system is a token based identification system that: 1) generates an interrogation signal using the interrogator; and, 2) upon receipt of a response from a previously identified RFID tracking tag the application will unlock a security code protecting access to the personal data device without requiring physically entering the security code directly into the personal data device. The RFID phone-unlocking system comprises an application and one or more tokens. The application comprises a set of programmed instructions implemented by the logic module. The RFID tracking tag is a token contained within the one or more tokens.

8 Claims, 5 Drawing Sheets

RFID PHONE-UNLOCKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of computers, calculating and counting, more specifically, a record carrier used for recognition within a security system.

SUMMARY OF INVENTION

The RFID phone-unlocking system is an application adapted for use with a personal data device. The personal data device further comprises a RFID interrogator. The RFID phone-unlocking system is an application that is adapted to run on the personal data device. The RFID phone-unlocking system is a token based identification system that: 1) generates an interrogation signal using the RFID interrogator; and, 2) upon receipt of a response from previously identified RFID tracking tag the application will unlock a security code protecting access to the personal data device without requiring physically entering the security code directly into the device.

These together with additional objects, features and advantages of the RFID phone-unlocking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the RFID phone-unlocking system in detail, it is to be understood that the RFID phone-unlocking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the RFID phone-unlocking system.

It is therefore important that the claims be regarded as including such equivalent construction insofar as they do not depart from the spirit and scope of the RFID phone-unlocking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
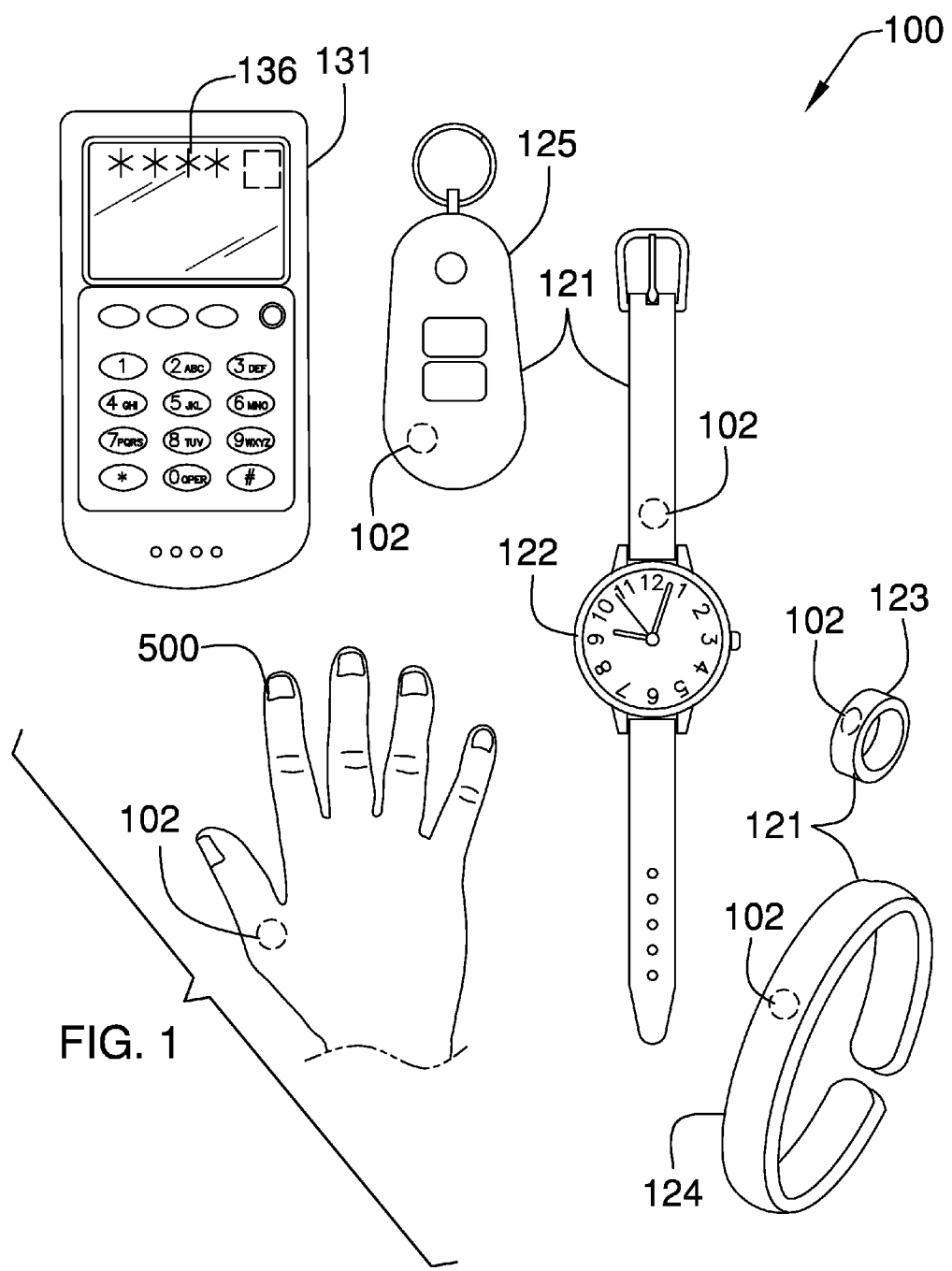
FIG. 1 is a front view of an embodiment of the disclosure.
Figure 2:
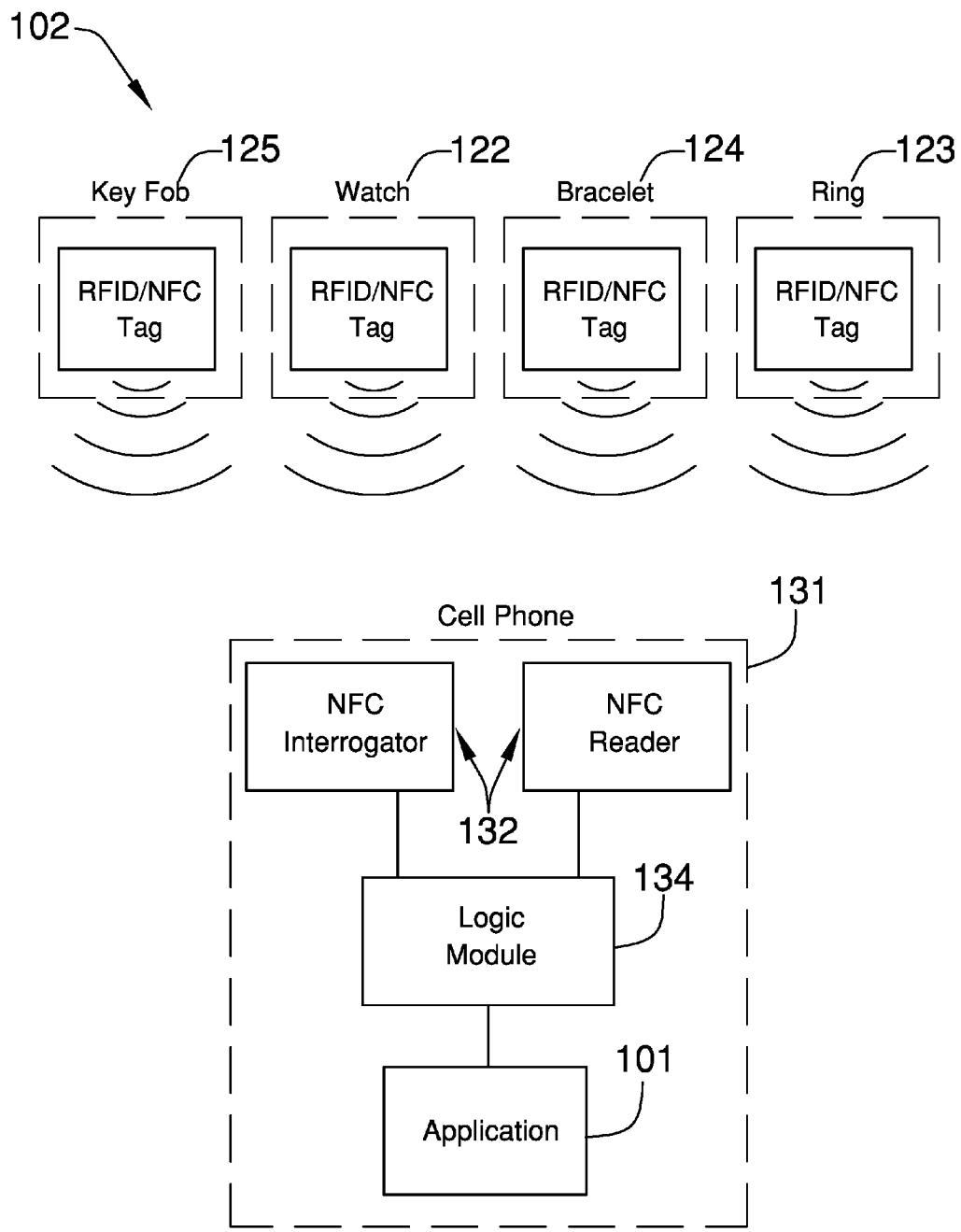
FIG. 2 is a block diagram of an embodiment of the disclosure.
Figure 3:
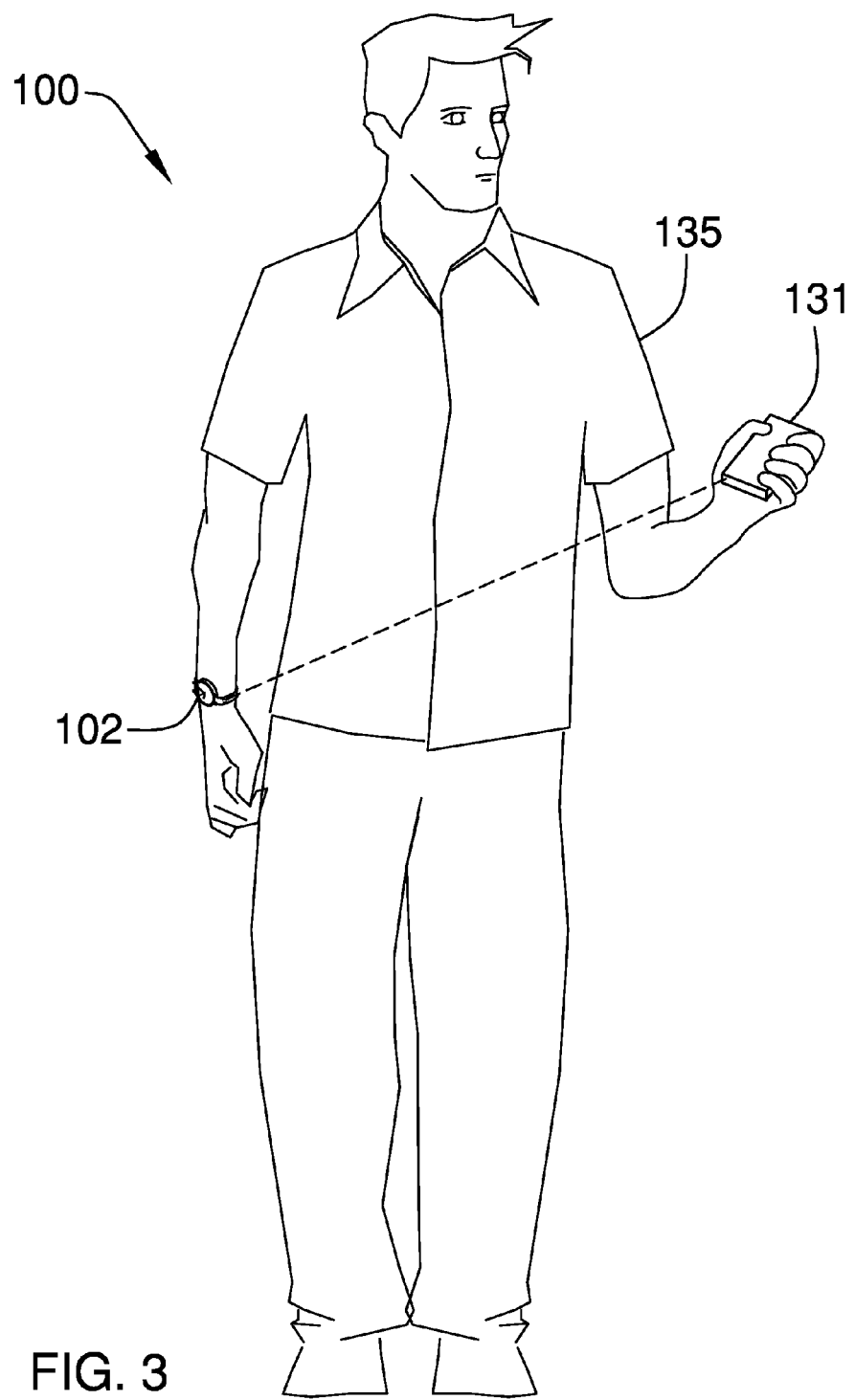
FIG. 3 is an in use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The RFID phone-unlocking system 100 (hereinafter invention) comprises an application 101 and one or more tokens 102. The application 101 comprises a set of programmed instructions implemented by the logic module 134 of the personal data device 131. The RFID tracking tag is a token contained within the one or more tokens 102. The invention 100 is an application 101 adapted for use with a personal data device 131. The personal data device 131 further comprises an RFID interrogator 132, a security code 136, and a logic module 134. The invention 100 is an application 101 that is adapted to run on the personal data device 131. The invention 100 is a token based identification system that: 1) generates an interrogation signal 133 using the RFID interrogator 132; and, 2) upon receipt of a response from a previously identified RFID tracking tag the application 101 will unlock the security code 136 protecting access to the personal data device 131 without requiring physically entering the security code 136 directly into the personal data device 131.

The application 101 is a programmed set of instructions that are adapted to be run via the logic module 134 on the personal data device 131. Methods to design, implement, and install an application 101 on a personal data device 131 are well known and documented in the electrical arts. The interrogator 132 of the personal data device 131 is an RFID based device that is adapted to send out an interrogation signal 133 for the purpose of generating and receiving a response from one or more RFID tags located in the vicinity of the personal data device 131. In the first potential embodiment of the disclosure, the interrogator 132 is a commercially available NFC device that is commonly incorporated into personal data devices 131.

Each of the one or more tokens 102 is an RFID tracking tag that is incorporated into a commonly carried domestic article such as a watch 122, ring 123, bracelet, 124 or key 125. Moreover, it is envisioned that the one or more tokens 102 may be configured to be implanted underneath the skin of an end user 500. Each of the one or more tokens 102 comprises an inductive loop 113 and an antenna 111. Such commonly carried domestic articles will be generically referred to as a fob 121. Each of the one or more tokens 102 attaches to or is contained within the fob 121. Each token selected from the one or more tokens receives the interrogation signal 133 through an electrically inductive loop 113. The selected token uses the energy generated by the interrogation signal 133 through the inductive loop 113 to generate a response signal to the interrogator 132. The response signal contains information that that specifically and uniquely identifies the specific token for the interrogator 132.

In the first potential embodiment of the disclosure, each of the one or more tokens 102 are tuned to respond to an interrogation signal 133 generated at 13.56 MHz in such a manner such that each of the one or more tokens 102 are compatible with NFC devices. In a second potential embodiment of the disclosure, a switch 112 is installed in a series circuit between the inductive loop 113 and the antenna 111 such that the circuit within any token selected from the one or more tokens can be opened in such a manner that the selected token will not respond to the interrogation signal 133.

In the first potential embodiment of the disclosure, each of the one or more tokens 102 is "linked" to the personal data device 131 such that the personal data device 131 will recognize each of the one or more tokens 102. This linking procedure that is analogous to the linking of a wireless headset, often informally referred to as Bluetooth, to a personal data device 131. The techniques and methods to implement this line of such methods are well known in the electrical and software arts.

Figure 4:
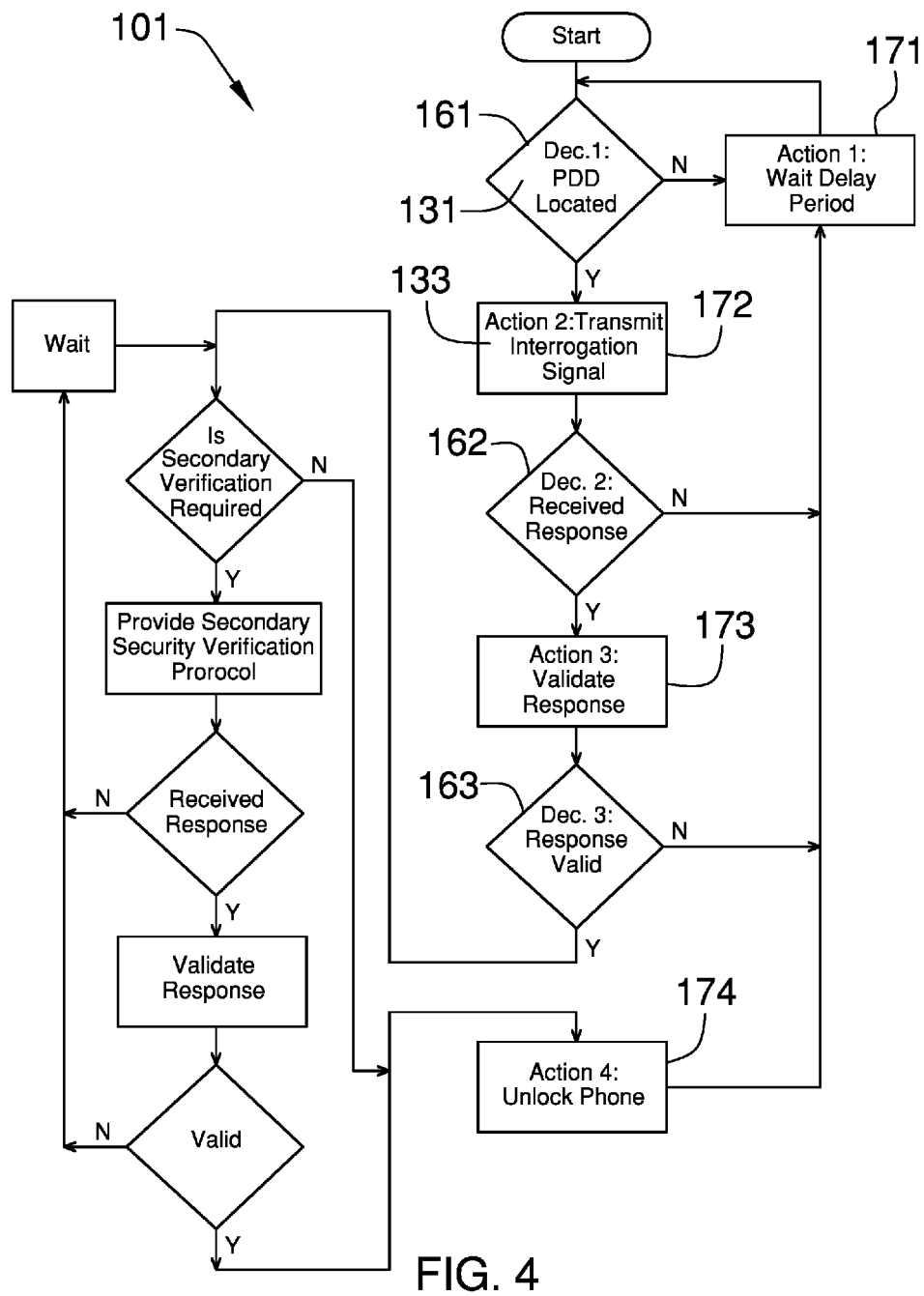
FIG. 4 is flowchart of an embodiment of the disclosure.
Figure 5:
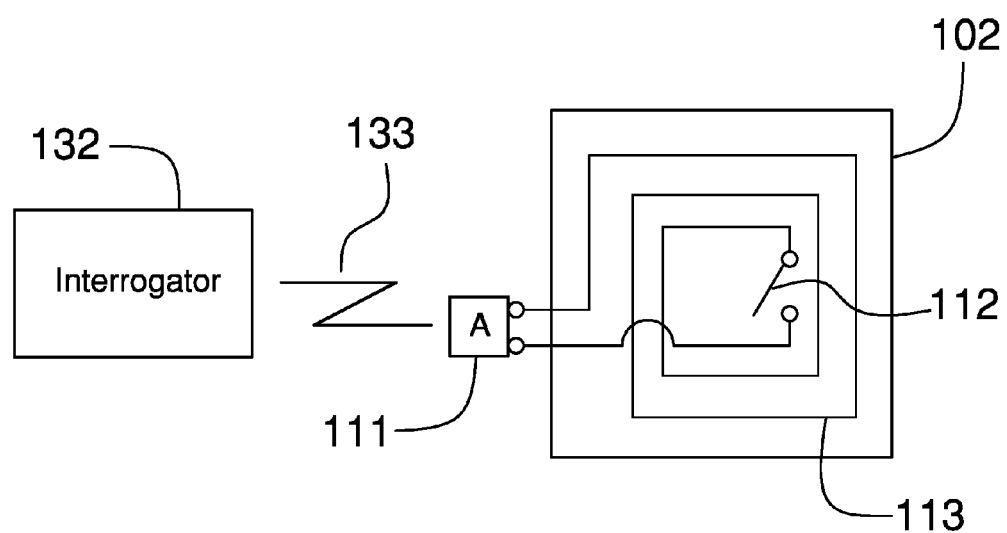
FIG. 5 is a block diagram of an embodiment of the disclosure.

The operation of the application 101 of the first potential embodiment of the disclosure, as shown in FIG. 4, is described in this paragraph. The application 101 makes a first decision 161 to determine whether access to the personal data device 131 is prevented by a requirement for a security code 136. If access to the personal data device 131 is not prevented by a requirement for a security code 136 the application 101 takes a first action 171 of waiting for a previously determined amount of time before looping back to the first decision 161. If access to the personal data device 131 is prevented by a requirement for a security code 136 the application 101 takes a second action 172 of enabling the interrogator 132 to transmit an interrogation signal 133. Once the interrogation signal 133 is transmitted, the application 101 makes a second decision 162 to determine if a response to the interrogation signal 133 is received. If a response to the interrogation signal 133 is not received, the application 101 loops back to the first action 171. If a response to the interrogation signal 133 is received, the application 101 takes a third action 173 of validating the response by confirming that the response was a valid response received from a token selected from the one or more tokens 102. The application 101 then makes a third decision 163 that the response was valid. If the application 101 determines that the response was not valid, the application 101 loops back to the first action 171. If the application 101 determines that the response was valid, the application 101 takes a fourth decision 174 to determine if the personal data device 131 requires a secondary validation such as the entry of a pass code. If a secondary validation is not required, the application 101 takes a fourth action 174 of overriding the security code 136 thereby allowing access to the personal data device 131.

If a secondary validation is required, the application 101 takes a fifth action 175 of implementing the secondary validation protocol by requesting a response to a security challenge. The application 101 makes a fifth decision 165 to determine if a response to the security challenge has been received. If a response to the security challenge has not been received, the application 101 loops to a seventh action 177 of implementing a delay for a predetermined period of time before looping back to the fourth decision 164. If a response to the security challenge has not been received, the application 101 takes a sixth action 176 of validating the received response to the security challenge. If the application 101 determines that the received response is valid, the application 101 takes the fourth action 174 of overriding the security code 136 thereby allowing access to the personal data device 131. If the received response is not valid, the application 101 loops to the seventh action 177. Once access to the personal data device 131 is granted, the application 101 completes the procedure by looping back to the first action 171. Methods to program personal data devices to implement the procedure described in this disclosure are well known and documented in the electrical and software arts.

To use the invention 100 a user 135 carries or wears a token selected from the one or more tokens 102. The operation of the application 101 is initiated on the personal data device 131. When the selected token is within range of the personal data device 131 the invention 100 will operate automatically.

The following definitions were used in this disclosure:

Application or App: As used in this disclosure, an application or app is a self-contained piece of software that is especially designed or downloaded for use with a personal data device.

Domestic Article: As used in this disclosure, a domestic article is an item or object: 1) that is commonly found within a household; or, 2) that is commonly carried by a person. Examples of domestic articles include, but are not limited to, keys and key fobs, personal data devices, glasses, remote controls, or personal storage items such as purses, briefcases, wallets, or cases.

Logic Module: As used in this disclosure, a logic module is an electrical device that is programmable and that accepts digital and analog inputs, processes the digital and analog inputs according to previously stored instruction and to provide the results of these instructions as digital or analog outputs.

Near Field Communication: As used in this disclosure, near field communication, commonly referred to as NFC, is an RFID technology and communication protocol that is commonly implemented on personal data devices.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

RFID: As used in this disclosure, RFID refers to Radio Frequency Identification technology. RFID is a wireless technology that uses electromagnetic field to identify and retrieve data from tracking tags that are placed on an object.

RFID Interrogator: As used in this disclosure, an RFID interrogator is a device that transmits a radio signal at frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. In this disclosure, though the RFID tags are mounted next to active components, the RFID tags themselves are passive, or unpowered, tags.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Token Based Identification System: As used in this disclosure, a token-based identification system is an electronic identification system wherein an interrogator maintained by a first party or a first device. The assumption is that the first party or a first device requires identification. The interrogator is used to interrogate a token held within the possession of a second party or second device to identify the second party or the second device. In response to the interrogation, the second party or the second device provides identification information to the first party or a first device. A system associated with the interrogator validates the identity of the second party or the second device using the identification information provided by the token. Once the identification is validated, the interrogator will take an action based on validated identification. A common example of this technology is a near field communication system, which is often referred to as a contactless system. In this system, a personal data device is used as the token. The interrogator will interrogate the personal data device using RFID technology and authorize a payment or data transfer based on the validated identification received from the personal data device.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A security system comprising:
   wherein the security system includes a processor and a memory;
   wherein the processor and the memory run an application;
   wherein the security system is an application adapted for use with a personal data device;
   wherein the personal data device further comprises an RFID interrogator, a security code, and a logic module;
   wherein the security system is an application that is adapted to run on the personal data device;
   wherein the security system is a token based identification system;
   wherein the security system generates an interrogation signal using the RFID interrogator;
   wherein the security system receives a response from a previously identified RFID tracking tag selected from one or more previously identified RFID tracking tags;
   wherein the application unlocks the security code protecting access to the personal data device without requiring physically entering the security code directly into the personal data device;
   wherein the security system further comprises one or more tokens;
   wherein each of the one or more tokens is an RFID tracking tag;
   wherein at least one token selected from the one or more tokens is carried by a user;
   wherein each of the one or more tokens is an RFID tracking tag that is incorporated into a domestic article;
   wherein each of the one or more tokens comprises an inductive loop and an antenna;
   wherein the inductive loop and the antenna form an electric circuit;
   wherein each token selected from the one or more tokens receives the interrogation signal through the inductive loop;
   wherein the selected token uses the energy generated by the interrogation signal through the inductive loop to generate a response signal through the antenna to the interrogator;
   wherein the response signal contains information that that specifically and uniquely identifies the specific token;
   wherein the interrogator is a first electronic device that operates at 13.56 MHz;
   wherein the each of the one or more tokens is a second electronic device that operates at 13.56 MHz;
   wherein each of the one or more tokens is linked to the personal data device such that the personal data device will recognize the response signal from each of the one or more tokens;
   wherein the application comprises a set of programmed instructions implemented by the logic module of the personal data device;
   wherein the user carries a token selected from the one or more tokens;
   wherein the domestic article is selected from the group consisting of a watch, a ring, a bracelet, or a key;
   wherein the one or more tokens is adapted to be implanted underneath the skin of said end user;
   wherein the application is able to make a plurality of decisions prior to making access to the personal data device;
   wherein the application comprises a set of programmed instructions implemented by the logic module of the personal data device;
   wherein the application makes a first decision to determine whether access to the personal data device is prevented by a requirement for a security code;

wherein the application takes a first action of waiting for a previously determined amount of time;

wherein the application takes a second action of enabling the interrogator to transmit an interrogation signal;

wherein the application makes a second decision to determine if a response signal to the interrogation signal is received;

wherein the application takes a third action of validating the response signal;

wherein the application validates the response signal by confirming that the response signal was received from a token that was linked to the personal data device;

wherein the application then makes a third decision that the response signal was valid;

wherein the application takes a fourth action of overriding the security code requirement allowing access to the personal data device.

2. The security system according to claim 1 wherein the user carries a token selected from the one or more tokens.

3. The security system according to claim 2 wherein the domestic article is selected from the group consisting of a watch, a ring, a bracelet, or a key; wherein the one or more tokens is adapted to be implanted underneath the skin of said end user.

4. The security system according to claim 1 wherein a switch is installed in a series circuit in the electric circuit between the inductive loop and the antenna such that the circuit within any token selected from the one or more tokens can be opened in such a manner that the selected token will not respond to the interrogation signal.

5. The security system according to claim 1
   wherein the user carries a token selected from the one or more tokens;
   wherein the domestic article is selected from the group consisting of a watch, a ring, a bracelet, or a key.

6. The security system according to claim 1
   wherein the application comprises a set of programmed instructions implemented by the logic module of the personal data device;
   wherein the application makes a first decision to determine whether access to the personal data device is prevented by a requirement for a security code;
   wherein the application takes a first action of waiting for a previously determined amount of time;
   wherein the application takes a second action of enabling the interrogator to transmit an interrogation signal;
   wherein the application makes a second decision to determine if a response signal to the interrogation signal is received;
   wherein the application takes a third action of validating the response signal
   wherein the application validates the response signal by confirming that the response signal was received from a token that was linked to the personal data device;
   wherein the application then makes a third decision that the response signal was valid;
   wherein the application takes a fourth action of overriding the security code requirement allowing access to the personal data device.

7. The security system according to claim 6 wherein the user carries a token selected from the one or more tokens.

8. The security system according to claim 7 wherein the domestic article is selected from the group consisting of a watch, a ring, a bracelet, or a key; wherein the one or more tokens is adapted to be implanted underneath the skin of said end user.

\* \* \* \* \*